US012806661B2

(12) United States Patent
Petkus et al.

(10) Patent No.: US 12,806,661 B2
(45) **Date of Patent: *Nov. 24, 2026**

(54) FORMULATION DELIVERY SYSTEM HAVING A SOLID CHEMISTRY

(71) Applicant: W.M. Barr & Company, Inc., Memphis, TN (US)

(72) Inventors: Matthew Michael Petkus, Memphis, TN (US); Kevin Andrew Kavchok, Huntersville, NC (US); Rachel Ann Farmer, Memphis, TN (US); Elizabeth Johnson, Cincinnati, OH (US); Alana Byrd, Memphis, TN (US)

(73) Assignee: W.M. Barr & Company, Inc., Memphis, TN (US)

( * ) Notice: Subject to any disclaimer, the term of this patent is extended or adjusted under 35 U.S.C. 154(b) by 336 days.

This patent is subject to a terminal disclaimer.

(21) Appl. No.: 18/510,186

(22) Filed: Nov. 15, 2023

(65) Prior Publication Data

US 2024/0082886 A1 Mar. 14, 2024

Related U.S. Application Data

(63) Continuation of application No. 17/124,215, filed on Dec. 16, 2020, now Pat. No. 11,833,552.

(Continued)

(51) Int. Cl.

| | |
|---|---|
| ***B08B 3/02*** | (2006.01) |
| ***B08B 3/04*** | (2006.01) |
| ***C11D 3/04*** | (2006.01) |
| ***C11D 3/395*** | (2006.01) |
| ***C11D 17/00*** | (2006.01) |

(52) U.S. Cl.

CPC ................ *B08B 3/026* (2013.01); *B08B 3/04* (2013.01); *C11D 3/04* (2013.01); *C11D 3/3953* (2013.01); *C11D 3/3955* (2013.01); *C11D 17/0047* (2013.01)

(58) Field of Classification Search

CPC ...................................................... B08B 3/026

See application file for complete search history.

(56) References Cited

U.S. PATENT DOCUMENTS

| | | |
|---|---|---|
| 2,064,178 A | 12/1936 | Pickard |
| 2,338,615 A | 1/1944 | Armstrong et al. |

(Continued)

FOREIGN PATENT DOCUMENTS

| | | |
|---|---|---|
| WO | 2013083929 A1 | 6/2013 |
| WO | 2021127219 A1 | 6/2021 |

OTHER PUBLICATIONS

Partial Search Report issued for corresponding EP App No. 20903599; issued Dec. 21, 2023 (12 Pages).

(Continued)

*Primary Examiner* — Jason Y Ko

(74) *Attorney, Agent, or Firm* — Jason A. Smith; Shumaker, Loop & Kendrick, LLP

(57) ABSTRACT

A formulation delivery system configured for outdoor use. The formulation delivery system includes a cleaning composition comprising chlorine, wherein the composition is in a form of a solid chemistry, and an outdoor cleaning device that is a spray wand having the cleaning composition positioned within a dispensing cartridge housed within the outdoor cleaning device.

31 Claims, 7 Drawing Sheets

Related U.S. Application Data

(60) Provisional application No. 63/108,619, filed on Nov. 2, 2020, provisional application No. 63/108,597, filed on Nov. 2, 2020, provisional application No. 62/951,376, filed on Dec. 20, 2019.

(56) References Cited

U.S. PATENT DOCUMENTS

| | | | |
|---|---|---|---|
| 3,770,205 | A | 11/1973 | Proctor et al. |
| 4,634,053 | A | 1/1987 | Herzfeld et al. |
| 4,713,079 | A | 12/1987 | Chun et al. |
| 4,812,070 | A | 3/1989 | Marty |
| 6,618,977 | B1 | 9/2003 | Curro |
| 6,814,306 | B1 | 11/2004 | Okubo |
| 6,948,663 | B1 | 9/2005 | Graham, Jr. et al. |
| 7,021,571 | B1 * | 4/2006 | Lawson ................ B05B 1/3006 239/597 |
| 7,124,962 | B1 | 10/2006 | Fryan et al. |
| 7,410,105 | B2 | 8/2008 | Horstman et al. |
| 8,403,241 | B2 | 3/2013 | Jung |
| 9,278,801 | B2 | 3/2016 | Gruder |
| 9,533,331 | B1 | 1/2017 | Kane et al. |
| 2003/0182839 | A1 | 10/2003 | Curro |
| 2004/0082491 | A1 | 4/2004 | Olson et al. |
| 2004/0226584 | A1 | 11/2004 | Guest et al. |
| 2010/0320157 | A1 | 12/2010 | Schnitzler |
| 2011/0052726 | A1 | 3/2011 | Smith et al. |
| 2011/0089253 | A1 | 4/2011 | Moorman |
| 2012/0228800 | A1 | 9/2012 | Arora et al. |
| 2013/0026250 | A1 | 1/2013 | Burt et al. |
| 2013/0109609 | A1 | 5/2013 | Smith et al. |
| 2018/0371727 | A1 | 12/2018 | Mercieca |
| 2019/0153363 | A1 | 5/2019 | Norimoto et al. |
| 2021/0187536 | A1 | 6/2021 | Kavchok et al. |

OTHER PUBLICATIONS

Extended Search Report issued for corresponding EP App No. 20903599; issued Jun. 6, 2024 (11 Pages).
International Search Report and Written Opinion issued for PCT/US2022/033808, dated Sep. 28, 2022 (8 pages).
International Search Report and Written Opinion issued for PCT/US2020/065671, dated May 7, 2021 (33 pages).
International Preliminary Report on Patentability issued for PCT/US2020/065671, dated May 17, 2022 (13 pages).
International Search Report and Written Opinion issued for PCT/US2020/065560, dated Mar. 15, 2021 (10 pages).
International Preliminary Report on Patentability issued for PCT/US2020/065560, dated May 17, 2022 (8 pages).
Office Action issued in corresponding CN App No. 202080097164.4 on May 28, 2024 (4 Pages).

* cited by examiner

FORMULATION DELIVERY SYSTEM HAVING A SOLID CHEMISTRY

CROSS-REFERENCE TO RELATED APPLICATIONS

This application claims priority from U.S. provisional patent application Ser. No. 62/951,376, filed on Dec. 20, 2019, from U.S. provisional patent application Ser. No. 63/108,597, filed on Nov. 2, 2020, and from U.S. provisional patent application 63/108,619, filed on Nov. 2, 2020, in the United States Patent and Trademark Office. The disclosures of which are incorporated herein by reference in their entireties.

FIELD OF THE INVENTION

The present invention relates to a formulation delivery system for use with an outdoor cleaning device, more particularly a formulation delivery system having a solid chemistry.

BACKGROUND OF THE INVENTION

Outdoor cleaning devices use hose end attachments that draw liquid formulations through a jug like container and out a sprayer device. The liquid formulation is drawn into the device and then dilutes the liquid to a certain desired concentration that is then applied to the exterior of a home, for example, to remove soils and stains such as or caused by mold, algae, bacteria, and fungus. Most outdoor cleaning devices marketed for mold, algae, bacteria, or fungus soils and stains use liquid bleach base products to apply the formulation. Some major drawbacks with such devices are limitation of using only liquid formulations, loss of water pressure from the suction and dilution needed with liquid chemistries, and containers are often heavy and awkward to hold (1 gallon being close to 10 lbs.) to accommodate the volume of the container needed to hold the liquid formulation. To address and solve these problems of consumers, alternative outdoor cleaning devices and formulation delivery systems are desired.

SUMMARY OF THE INVENTION

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

The present invention is a formulation delivery system for use with an outdoor cleaning device such as a spray wand. The formulation delivery system comprises a chemical composition in a solid form.

In an embodiment of the invention, a formulation delivery system comprises a composition comprising chlorine, wherein the composition is in a form of a solid chemistry, and wherein the outdoor cleaning device is a spray wand containing the composition.

In an embodiment of the invention, a spray wand is provided. The spray wand comprises; a spray wand body having a hollow tube with a wand spray end, an optional spray end selector attached to the wand spray end, a refill cartridge assembly for attachment to the hollow tube, wherein the spray wand body is configured for receiving the refill cartridge inside of the spray wand body, a wand hose end having a handle connected to the spray wand body having the cartridge, wherein the wand hose end has a wand hose end valve for control of water flow from a hose; and a composition comprising chlorine in the refill cartridge assembly, wherein the composition is in a form of a solid chemistry.

In an embodiment of the invention, a refill cartridge assembly is provided. The refill cartridge assembly comprises a composition comprising chlorine in the refill cartridge assembly, wherein the composition is in a form of a solid chemistry.

In an embodiment of the invention, the chlorine is selected from the group consisting of calcium hypochlorite; 1,3,5-Triazine-2,4,6(1H,3H,5H)-trione, 1,3-dichloro-, sodium salt, dihydrate (dichlor); 1,3,5-Trichloro-1,3,5-triazinane-2,4,6-trione (trichlor), chloramine-T hydrate, and a combination thereof.

BRIEF DESCRIPTION OF THE DRAWINGS

The present invention will become more fully understood from the detailed description and the accompanying drawings, which are not necessarily to scale, wherein.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

The present invention is a formulation delivery system for use with an outdoor cleaning device. The formulation delivery system comprises a chemical composition in a solid form. The compositions of solid chemistry of the present application have, for example, mold, algae, bacteria, and fungus killing and cleaning power.

In an embodiment of the present invention, the solid chemistry comprises chlorine. Examples of the chlorine-containing solid chemistry include, but are not limited to, calcium hypochlorite; 1,3,5-Triazine-2,4,6(1H,3H,5H)-trione, 1,3-dichloro-, sodium salt, dihydrate (dichlor); 1,3,5-

Trichloro-1,3,5-triazinane-2,4,6-trione (trichlor), chloramine-T hydrate, and a combination thereof.

The solid chemistry of the present invention may be used in combination with other active and/or inert ingredients including, but not limited to, sodium sulfate, magnesium stearate, sodium bicarbonate, sodium metasilicate, sodium silicate, magnesium silicate, sodium carbonate, calcium chloride, calcium hydroxide, calcium carbonate, sodium chloride, water, and a combination thereof.

The use of the solid chemistry of the present invention eliminates the need for a liquid chemical formulation. By eliminating liquid formulations, the weight of the product is reduced and a greater water pressure can be achieved from a home of a consumer and without the restricted water flow of other outdoor cleaning devices.

In an embodiment of the present invention, the solid chemistry of the formulation of the present invention has a consistent and an effective amount of chlorine to provide mold, algae, bacteria, and fungus killing and cleaning effects. By the chemistry being in a solid form such as tablets, it is possible to adjust the rate at which the solid dissolves and thus deliver an appropriate amount of chlorine. The tablets are suitable for use in an outdoor cleaning device or wand having a cartridge capable of containing a solid chemistry.

Figure 1A:
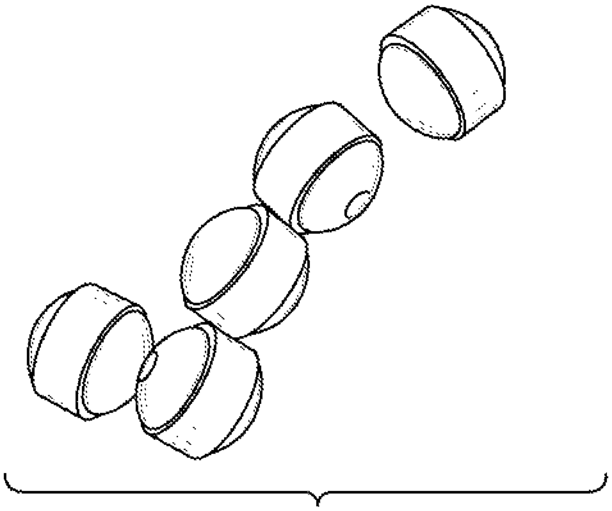
FIGS. 1A and 1B illustrate the solid chemistry of the present invention being in the form of tootsie-pop shaped (circular with ridge) solid tablets.
Figure 1B:
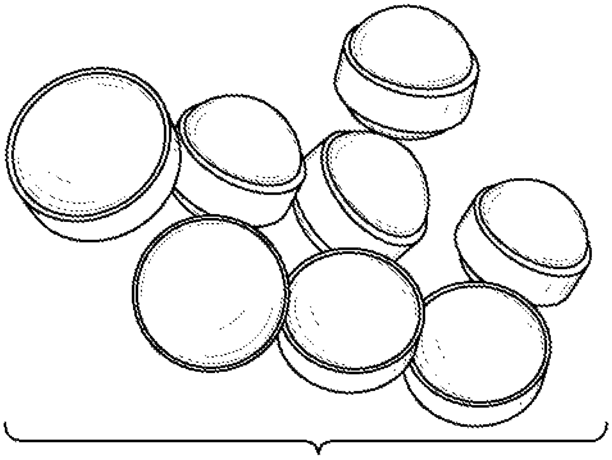
Figure 1C:
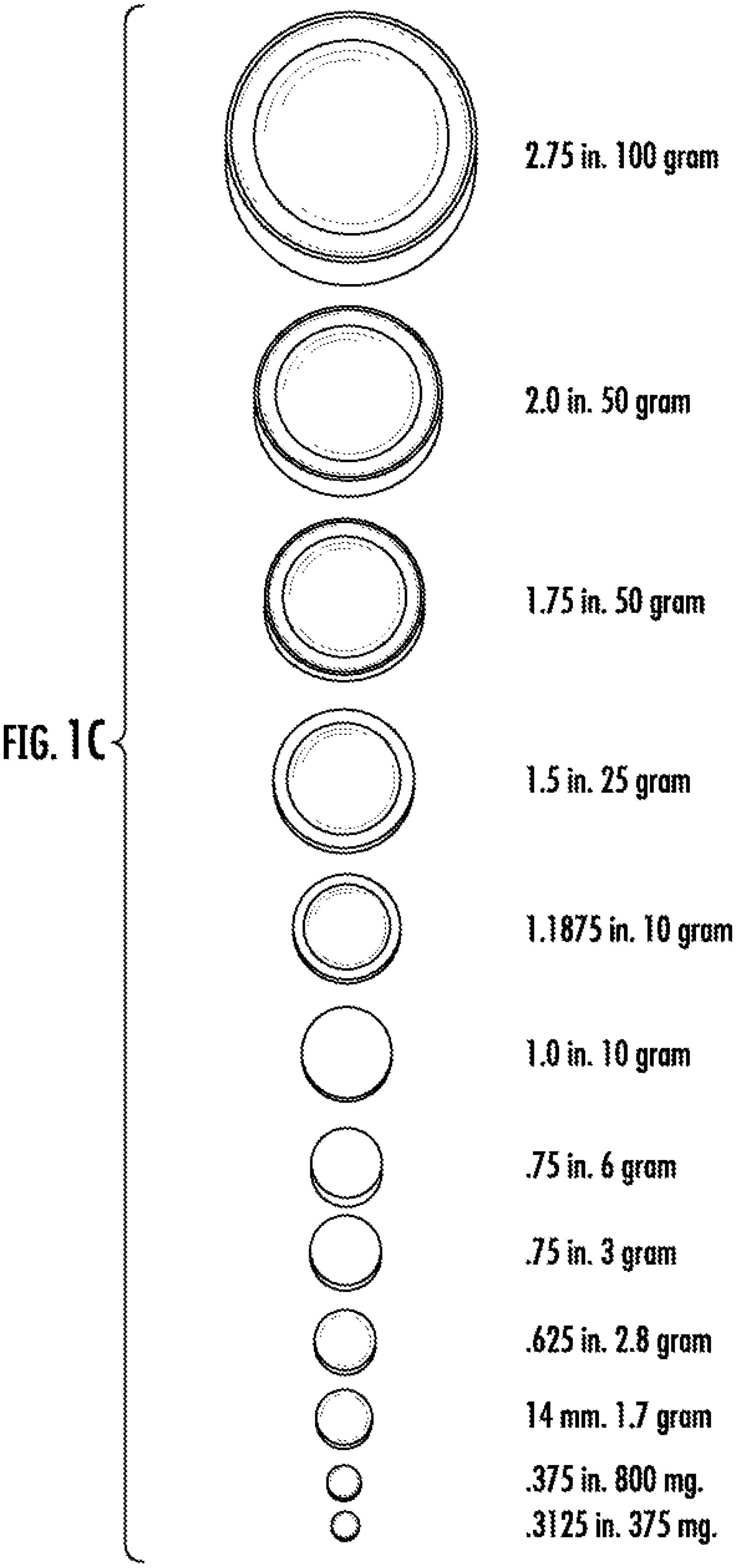
FIG. 1C illustrates varying tablet weight and diameter.

The solid chemistry of the present invention may be in any shape or form including, but not limited to, round tablets, beads, cylinder-shaped, tootsie pop-shaped (circle with ridge), pellets, or a combination thereof. FIGS. 1A and 1B illustrate the solid chemistry of the present invention being in the form of solid tablets having tootsie pop-shaped (circle with ridge). The tablet may be of varying weight. For example, the tablet may have a weight in a range of 375 mg to 100 grams. Preferably, a tablet has a weight in a range of 0.25 grams to 3 grams. However, a tablet having a weight outside of this weight range is still contemplated for use in the present invention. For example, the total weight of tablets used in a cylindrical cartridge is preferably in a range of 100 grams to 500 grams in total weight of solid tablets. The tablets can also vary in diameter. For example, a tablet may have a tablet diameter in a range of 0.125 inches to 2.75 inches. FIG. 1C illustrates, for example, varying tablet diameter from 0.3125 inches to 2.75 inches and illustrates varying tablet weight from 375 mg to 100 g.

It is also contemplated and within the scope of the present invention that the source of chlorine can be changed to get different levels of chlorine over time and different rates of availability.

In an embodiment of the invention, a solid tablet comprises calcium hypochlorite in a range of 40 weight % active to 75 weight % active, and inert or other ingredients in a range of 25 weight % to 60 weight %. Inerts and other ingredients such as sodium sulfate, magnesium stearate, sodium carbonate, sodium bicarbonate, sodium metasilicate, sodium silicate, magnesium silicate, calcium chloride, calcium hydroxide, calcium carbonate, sodium chloride, and water work well made into a solid tablet from 0.5 to 3 grams, for example.

In an embodiment of the invention, a solid tablet comprises dichlor mixed with sodium sulfate and magnesium stearate in a range of 35% to 100% dichlor by weight. Different ratios of dichlor and sodium sulfate change the dissolving rate of the tablet. To get an optimum dilution out of the outdoor spray device or wand, the solid chemistry may be used in parallel with a swirl producing device. Other combinations to be used with dichlor may include, but are not limited to, sodium chloride, calcium chloride, sodium carbonate, sodium bicarbonate, calcium carbonate, sodium silicate, magnesium silicate, sodium metasilicate, and combinations thereof.

Figure 2:
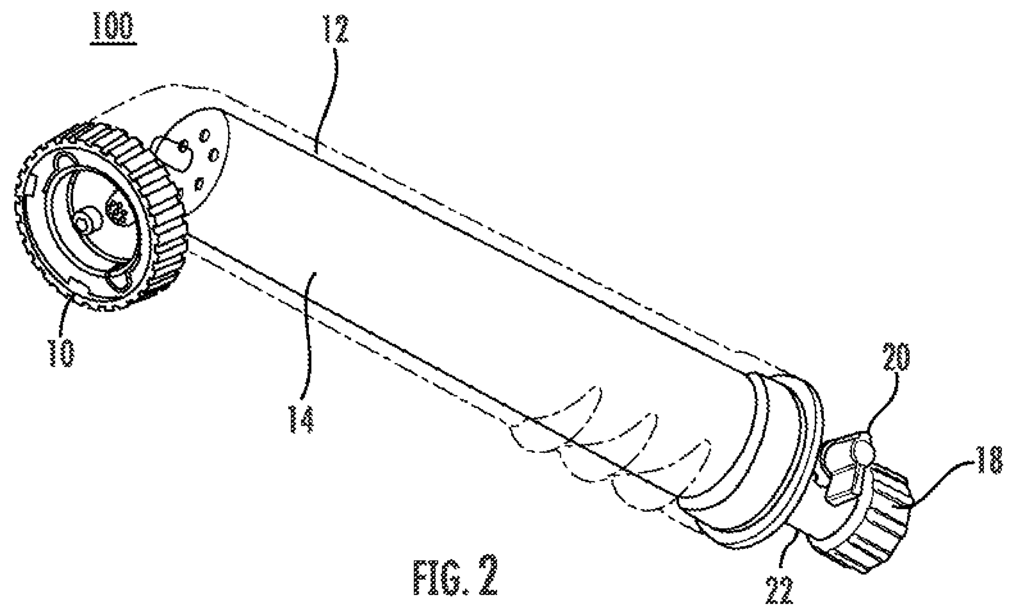
FIG. 2 is an isometric view of a spray wand with a refill cartridge assembly in accordance with the present invention.

The solid chemistry of the present invention is suitable for use with a spray device or wand as shown in FIG. 2. FIG. 2 is an isometric view of the spray wand with a refill cartridge assembly in accordance with the present invention. As shown in FIG. 2, a spray wand 100 comprises a spray nozzle 10, a spray body 12 shown in a shape of a tube, and a replaceable refill cartridge assembly 14 inside of spray body 12. Spray wand 100 comprises non-disposable spray body 12 and replaceable refill cartridge assembly 14 having a refill cartridge that holds a chemical or chemical formulation in solid form, also referred to herein as the solid chemistry. At a shut-off or hose end of spray wand 100, a user connects a garden hose with a rotating or swivel hose nut to a hose nut 18 of the hose end. The user can open and close the fluid flow with a shut-off valve 20. Shut-off valve 20 is located on a handle 22 of spray wand 100 which allows the user, for example, to turn off water in the middle of use at handle 22 and detach the spray body to replace the solid chemistry or cartridge.

Water passes through refill cartridge assembly 14 in a tangential swirling manner that tumbles or flows through the solid chemistry, maximizing exposure to the solid chemistry resulting in higher applied chemistry concentration. The chemistry fluid mix is dispensed at distal nozzle 10. The user can rotate nozzle 10 to select a desired spray setting. Although two settings are shown, additional spray settings may be present and are within the scope of the present invention. Nozzle 10 preferably has one or more detented positions, more preferably four detented positions.

Figure 3:
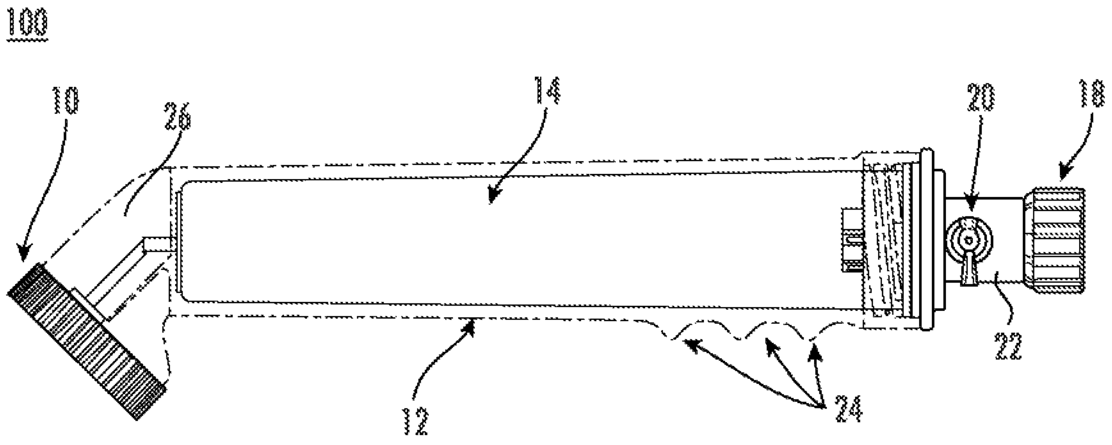
FIG. 3 is a side view of the spray wand with the refill cartridge assembly of FIG. 2.

FIG. 3 is a side view of the spray wand with the refill cartridge assembly of FIG. 2. In FIG. 3, optional molded in grip features 24 are shown on spray body 12. By having grips 24 on spray body 12 versus further down past shutoff end, torque on an arm of a user is minimized, thus reducing user fatigue. FIG. 3 illustrates that spray wand 100 comprises spray body 12. Spray body 12 is comprised of a hollow tube, preferably transparent, with an angled wand spray end 26 attached to spray end selector or nozzle 10. FIG. 3 also illustrates shut-off valve 20 for control of water flow from a hose and hose nut 18 for connection to the hose. Spray wand 100 is particularly suited for cleaning outdoor hard surfaces.

Figure 4:
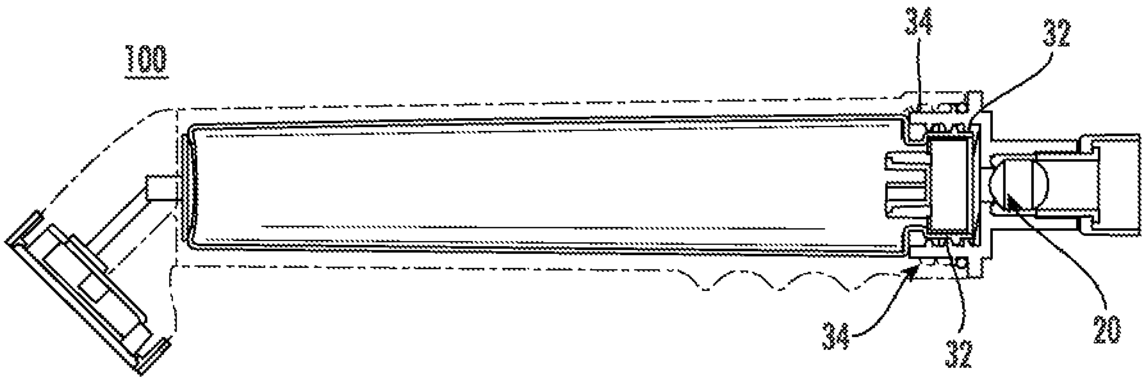
FIG. 4 is a cross-sectional view of the spray wand with the refill cartridge assembly.

FIG. 4 is a cross-sectional view of spray wand 100 with refill cartridge assembly 14. As shown in FIG. 4, external threads on the refill cartridge thread into internal threads 32 of the handle of the shut-off end of the spray wand. Once the refill cartridge is secure, the user threads the refill cartridge/shut-off assembly into threads 34 of the spray body. At this point the user rotates the shut-off valve 20 from the closed position to the open position and dispenses product.

Figure 5:
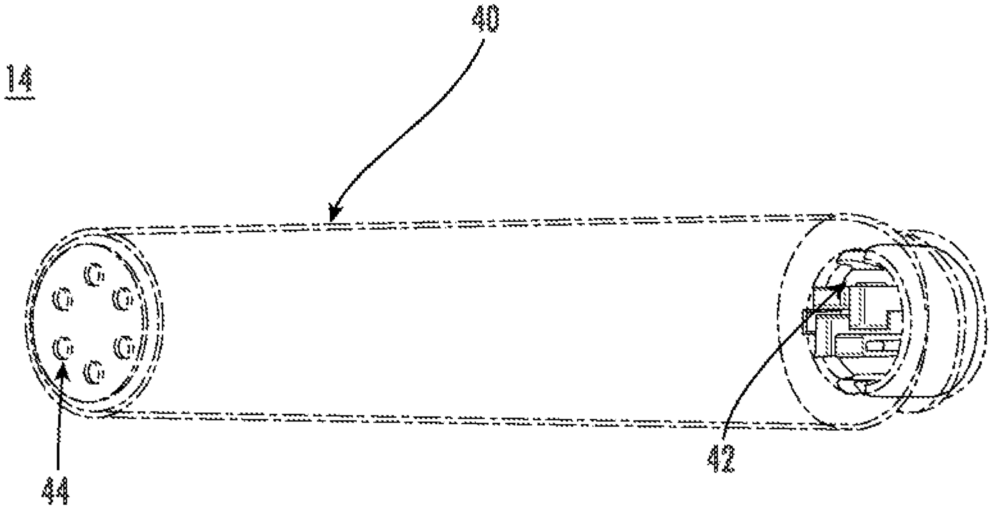
FIG. 5 illustrates the refill cartridge assembly.

FIG. 5 illustrates refill cartridge assembly 14. The refill cartridge assembly is comprised of a tubular refill cartridge 40, preferably transparent, and a swirl chamber 42 snapped into or otherwise attached or affixed to the proximal end of tubular refill cartridge 40. Refill cartridge 40 is hollow but is to be filled to contain the solid chemistry. Preferably, the tubular refill cartridge 40 is prefilled with the solid chemistry. Water enters the proximal end, travels through swirl chamber 42, the water tangentially tumbles or flows through the solid chemistry present and exits through orifices 44 on the distal end of refill cartridge 40.

Figure 6:
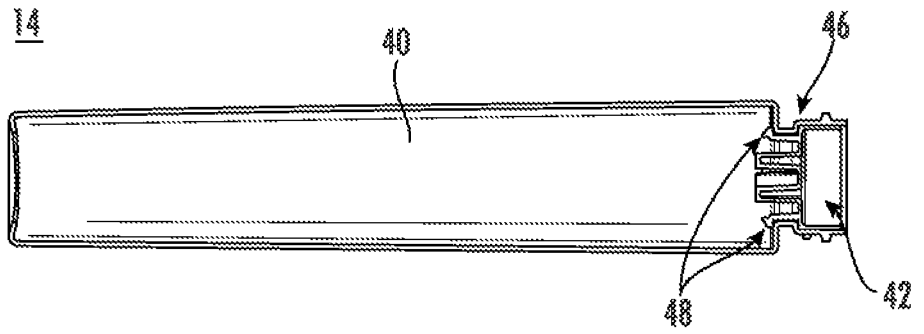
FIG. 6 is a cross-sectional view of the refill cartridge assembly.

FIG. 6 is a cross-sectional view of the refill cartridge assembly 14. FIG. 6 illustrates how swirl chamber 42 is positioned within the refill cartridge. Swirl chamber 42 is inserted or pushed into refill cartridge 40 until swirl chamber 42 bottoms out on a shoulder(s) 46 of refill cartridge 40. Prongs or tabs 48 extending as part of swirl chamber 42 provide a one-way snap feature to engage with refill cartridge 40 preventing removal. It is also conceived that the swirl chamber could be adhered to the cartridge using a ratchet thread or other child resistant feature.

Spray wand 100 by use of swirl chamber 42 creates turbulence and/or a cyclone effect with water flow within the tubular body and re-directs the water flow over the solid chemistry so that the solid chemistry does not dilute too quickly and achieves chemical concentrations needed for effectiveness. Changing the refill cartridge is used to meter the water flow to achieve an appropriate dilution of the solid chemistry. This is important for certain chemical products, such as products used to kill mold.

The advantage to the user with a transparent refill cartridge is that visibility allows the user to see the solid chemistry dissolve and to also know when to replace the solid chemistry and/or refill cartridge. The refill cartridge top has holes small enough to keep beads from blocking an exit orifice, but yet water moving through the exit orifice uninterrupted. Another benefit is the user need not touch the solid chemistry which can be toxic or is in concentrated solid form. The screw in/threaded connection of the refill cartridge assembly to the handle of the spray wand allows for water to pass through the refill cartridge for proper dilution of solid chemistry.

Figure 7:
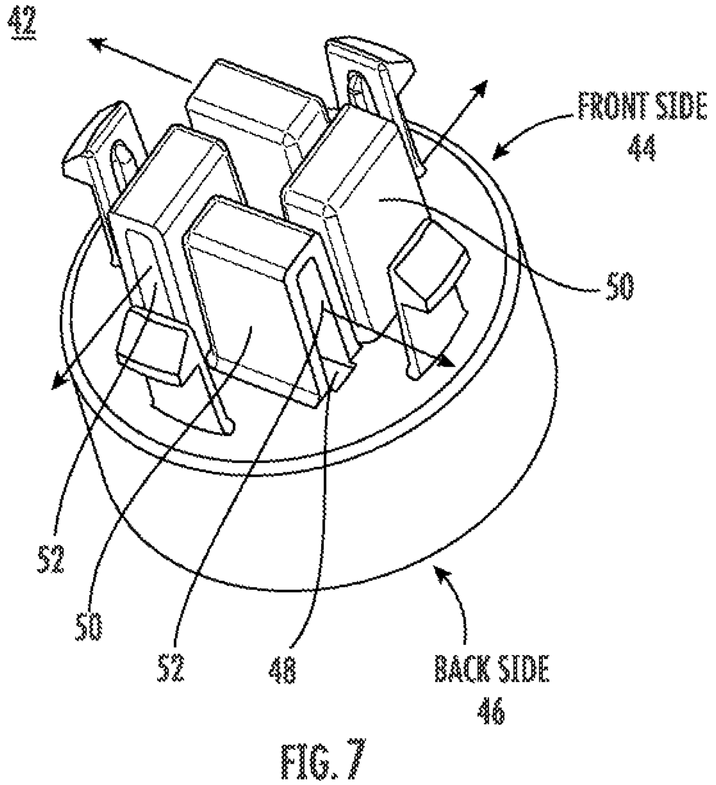
FIG. 7 illustrates a swirl chamber.

FIG. 7 illustrates a swirl chamber 42. Swirl chamber 42, having a front side 44 and a back side 46, creates a fluid tumble within the refill cartridge. Without the swirling and tumbling of water, the water would directly pass through the refill cartridge and result in a lower concentration of chemistry. Water enters in a linear fashion on back side 46 of swirl chamber 42. The swirl chamber causes a directional change and the fluid exits in a tangential manner. Potential swirl chamber configurations may include one or more tangential channels 48, preferably two or more tangential channels 48. Channels 48 may be of various geometric shapes such as rectangular or helical. Providing spacing between channels results in greater tangential forces, however, it may or may not result in greater concentration. The swirl chamber has one or more raised projections 50 having fluid exit windows 52, and the fluid exit windows may be rectangular, square, round, or another shape. As illustrated, rectangular is shown. The swirl chamber may have various configurations. Considerations for selecting a configuration include, but are not limited to, suitability for an injection molding process, and cross-sectional flow area as to not restrict fluid flow. FIGS. 15A-E illustrate various views of the swirl chamber including illustrating channels 48.

During use, water passes through the swirl chamber and creates a swirl or vortex. The swirl chamber aids in preventing release of chemical too quickly or tapering off too fast. It is used to mix the water and dissolving chemical preferably at an even ratio.

As indicated above, swirl chamber 42 may have alternate configurations and still be within the scope of the present invention so long as the configuration creates a swirl or vortex of water when water passes through the swirl chamber. For example, water comes in as one stream and creates several streams in one direction to create swirl or cyclone effect.

Figure 8:
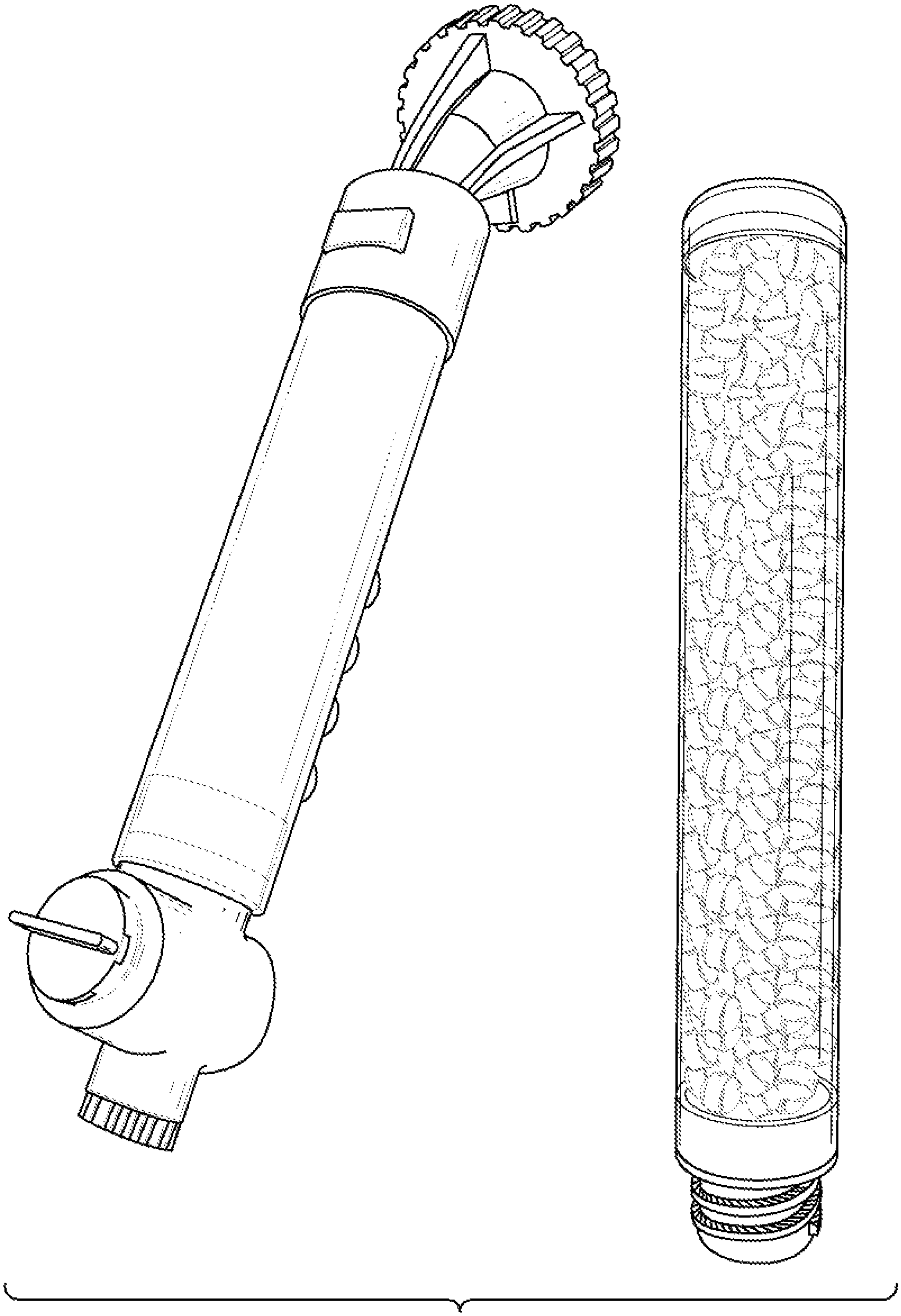
FIG. 8 is an illustration of a spray wand device suitable for containing the solid chemistry in the refill cartridge assembly in accordance with the present invention.

FIG. 8 is an illustration of a spray wand device suitable for containing the solid chemistry in the refill cartridge assembly in accordance with the present invention. The solid chemistry being contained in the refill cartridge of the spray wand device is illustrated in FIG. 8.

Using solid chemistry allows for the ability to design lighter weight products for the end consumer, as well as mitigate the use of water restrictors which are needed in existing outdoor cleaning devices. Without needing a water restrictor, a device can shoot further and have more power. With these benefits a consumer can clean or treat a wider array of outdoor surfaces such as high windows, second story surfaces, gutters, among others. Solid chemistry also allows for the consumer to have some control over the dilution and thus strength of what is coming out of the device. If the consumer were to allow the solid chemistry to dissolve longer in the system, they would have a more concentrated or "super charged" amount of chlorine to blast away their heavier stains.

The formulation delivery system of the present invention may be used with hydantoins to provide cleaning and bleaching efficacy. Hydantoins are organic compounds that release halogen bleach when dissolved in water. Examples of such compound(s) that may be used in combination with the refill cartridge and/or spray wand include, but are not limited to, bromo-1-chloro-5,5-dimethylhydantoin, dichlorodimethyl hydantoin, dichloroethylmethyl hydantoin, and a combination thereof. It is contemplated and within the scope of the present invention that these compounds could be used in the formulation delivery system to achieve exterior cleaning on mold, algae, bacteria, fungus, and when combined with other raw materials could provide benefits in outdoor cleaning. Some combinations of the use of hydantoins with other raw materials include the use of sodium citrate, anionic surfactants such as alkyl benzene sulfonates and sodium lauryl sulfate, sodium carbonate, hydrated silica, sodium chloride, among others.

The refill cartridge assembly may comprise a refill cartridge and a composition comprising a hydantoin compound contained in the refill cartridge of the refill cartridge assembly, wherein the composition is in a form of a solid chemistry.

EXAMPLE

Data was obtained in accordance with the formulation delivery system having a solid chemistry of the present invention.

Figure 9:
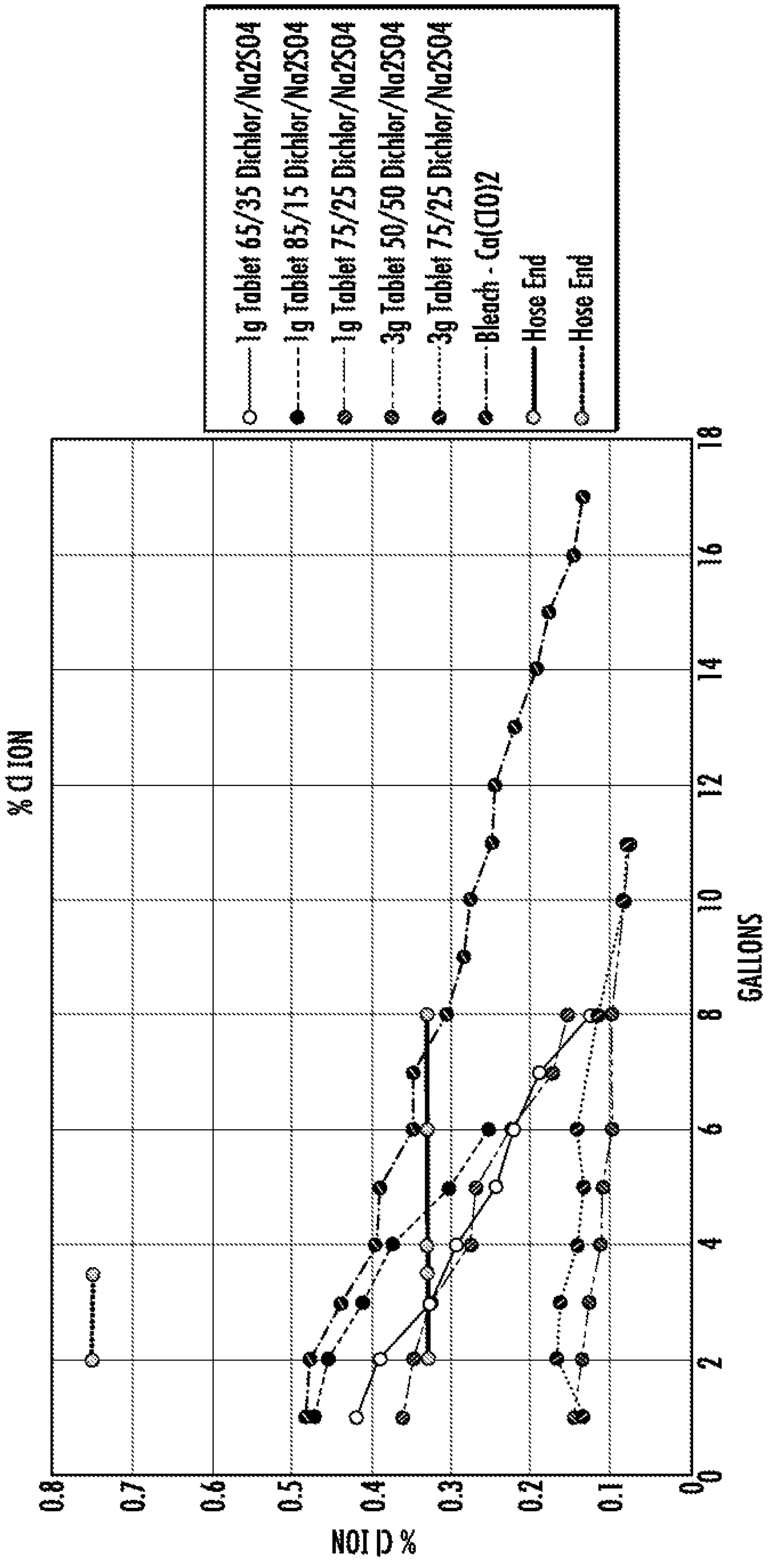
FIG. 9 illustrates a graphical representation of data obtained comparing the chlorine concentration over gallons of water captured through the system using the solid chemistry.

FIG. 9 illustrates a graphical representation of data obtained in accordance with the formulation delivery system having a solid chemistry of the present invention. The wand was attached to a hose, sprayed into gallon measurements through the wand device, and then titrated each gallon for chlorine content to understand dissolution rate.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

The invention claimed is:

1. A formulation delivery system configured for outdoor use, the formulation delivery system comprising:

a cleaning composition comprising chlorine, wherein the composition is in a form of a solid chemistry, and a spray wand having the cleaning composition positioned within a refill cartridge housed within the spray wand, wherein a longitudinal axis of the refill cartridge and a longitudinal axis of the spray wand are co-axially aligned with one another.

2. The formulation delivery system according to claim 1, wherein chlorine is selected from the group consisting of calcium hypochlorite; 1,3,5-Triazine-2,4,6 (1H,3H,5H)-trione, 1,3-dichloro-, sodium salt, dihydrate (dichlor); 1,3,5-Trichloro-1,3,5-triazinane-2,4,6-trione (trichlor), chloramine-T hydrate, and a combination thereof.

3. The formulation delivery system according to claim 2, wherein the composition further comprises an ingredient selected from the group consisting of sodium sulfate, magnesium stearate, sodium metasilicate, sodium silicate, magnesium silicate, calcium chloride, calcium hydroxide, calcium carbonate, sodium chloride, water, and a combination thereof.

4. The formulation delivery system according to claim 1, wherein the solid chemistry is in a shape of a tablet, bead, cylinder, circle with ridge, pellet, and a combination thereof.

5. The formulation delivery system according to claim 1, wherein the chlorine-containing composition comprises calcium hypochlorite in a range of 40 weight % active to 75 weight % active, and an inert or other ingredient in a range of 25 weight % to 60 weight % based on the weight of the chlorine-containing composition.

6. The formulation delivery system according to claim 1, wherein the chlorine-containing composition comprises dichlor mixed with sodium sulfate and magnesium stearate in an amount of 35% to 100% dichlor by weight.

7. The formulation delivery system according to claim 1, wherein the chlorine-containing composition comprises dichlor in combination with a component selected from the group consisting of sodium sulfate, magnesium stearate, sodium chloride, calcium chloride, calcium carbonate, sodium silicate, magnesium silicate, sodium metasilicate, and a combinations thereof.

8. A spray wand comprising: a first end, a second end opposite the first end, and a body intermediate the first end and the second end; wherein the first end comprises an adjustable wand spray end that varies dispensing flow patterns from the spray wand and the second end comprises a wand hose end having a handle;

a refill cartridge configured to be housed within the body and axially aligned with a longitudinal axis of the body when the spray wand is fully assembled;

and a cleaning composition comprising chlorine in the refill cartridge, wherein the composition is in a form of a solid chemistry.

9. The spray wand according to claim 8, wherein chlorine is selected from the group consisting of calcium hypochlorite; 1,3,5-Triazine-2,4,6 (1H,3H,5H)-trione, 1,3-dichloro-, sodium salt, dihydrate (dichlor); 1,3,5-Trichloro-1,3,5-triazinane-2,4,6-trione (trichlor), chloramine-T hydrate, and a combination thereof.

10. The spray wand according to claim 9, wherein the composition further comprises an ingredient selected from the group consisting of sodium sulfate, magnesium stearate, sodium metasilicate, sodium silicate, magnesium silicate, calcium chloride, calcium hydroxide, calcium carbonate, sodium chloride, water, and a combination thereof.

11. The spray wand according to claim 8, wherein the chlorine-containing composition comprises calcium hypochlorite in a range of 40 weight % active to 75 weight % active, and an inert or other ingredient in a range of 25 weight % to 60 weight % based on the weight of the chlorine-containing composition.

12. The spray wand according to claim 8, wherein the chlorine-containing composition comprises dichlor mixed with sodium sulfate and magnesium stearate in an amount of 35% to 100% dichlor by weight.

13. The spray wand according to claim 8, wherein the chlorine-containing composition comprises dichlor in combination with a component selected from the group consisting of sodium sulfate, magnesium stearate, sodium chloride, calcium chloride, calcium carbonate, sodium silicate, magnesium silicate, sodium metasilicate, and a combinations thereof.

14. A refill cartridge assembly comprising:

a refill cartridge having an inlet, an outlet, and a body positioned between the inlet and outlet, wherein the refill cartridge is configured to be housed within and co-axially aligned with a longitudinal axis of a spray wand, and a composition comprising chlorine contained in the refill cartridge of the refill cartridge assembly, wherein the composition is in a form of a solid chemistry.

15. The refill cartridge assembly according to claim 14, wherein chlorine is selected from the group consisting of calcium hypochlorite; 1,3,5-Triazine-2,4,6 (1H,3H,5H)-trione, 1,3-dichloro-, sodium salt, dihydrate (dichlor); 1,3,5-Trichloro-1,3,5-triazinane-2,4,6-trione (trichlor), chloramine-T hydrate, and a combination thereof.

16. The refill cartridge assembly according to claim 14, wherein the composition further comprises an ingredient selected from the group consisting of sodium sulfate, magnesium stearate, sodium bicarbonate, sodium metasilicate, sodium silicate, magnesium silicate, sodium carbonate, calcium chloride, calcium hydroxide, calcium carbonate, sodium chloride, water, and a combination thereof.

17. The refill cartridge assembly according to claim 14, wherein the chlorine-containing composition comprises calcium hypochlorite in a range of 40 weight % active to 75 weight % active, and an inert or other ingredient in a range of 25 weight % to 60 weight % based on the weight of the chlorine-containing composition.

18. The refill cartridge assembly according to claim 14, wherein the chlorine-containing composition comprises dichlor mixed with sodium sulfate and magnesium stearate in an amount of 35% to 100% dichlor by weight.

19. The refill cartridge assembly according to claim 14, wherein the chlorine-containing composition comprises dichlor in combination with a component selected from the group consisting of sodium sulfate, magnesium stearate, sodium chloride, calcium chloride, calcium carbonate, sodium silicate, magnesium silicate, sodium metasilicate, and a combinations thereof.

20. The formulation delivery system according to claim 1, wherein the composition further comprises an ingredient selected from the group consisting of sodium sulfate, magnesium stearate, sodium metasilicate, sodium bicarbonate, sodium carbonate, sodium silicate, magnesium silicate, calcium chloride, calcium hydroxide, calcium carbonate, sodium chloride, water, and a combination thereof.

21. The formulation delivery system according to claim 1, wherein the chlorine containing composition comprises dichlor in combination with a component selected from the group consisting of sodium sulfate, magnesium stearate, sodium chloride, sodium bicarbonate, sodium carbonate, calcium chloride, calcium carbonate, sodium silicate, magnesium silicate, sodium metasilicate, and a combinations thereof.

22. The spray wand according to claim 8, wherein the composition further comprises an ingredient selected from the group consisting of sodium sulfate, magnesium stearate, sodium metasilicate, sodium silicate, magnesium silicate, calcium chloride, calcium hydroxide, sodium bicarbonate, sodium carbonate, calcium carbonate, sodium chloride, water, and a combination thereof.

23. The spray wand according to claim 8, wherein the chlorine-containing composition comprises dichlor in combination with a component selected from the group consisting of sodium sulfate, magnesium stearate, sodium chloride, calcium chloride, calcium carbonate, sodium silicate, magnesium silicate, sodium bicarbonate, sodium carbonate, sodium metasilicate, and a combinations thereof.

24. The refill cartridge assembly according to claim 14, wherein the chlorine containing composition comprises dichlor in combination with a component selected from the group consisting of sodium sulfate, magnesium stearate, sodium chloride, calcium chloride, calcium carbonate, sodium silicate, magnesium silicate, sodium bicarbonate, sodium carbonate, sodium metasilicate, and a combinations thereof.

25. The formulation delivery system of claim 1, further comprising a swirl chamber having a plurality of partially enclosed openings that extend along a longitudinal axis of the spray wand, each partially enclosed opening of the plurality of partially enclosed openings configured to convert a flow path of the single liquid stream that is parallel to the longitudinal axis of the spray wand to a cyclonic liquid stream that is angled relative to the longitudinal axis of the spray wand.

26. The formulation delivery system of claim 25, wherein each partially enclosed opening of the plurality of partially enclosed openings have different flow paths within the refill cartridge relative to one another.

27. The spray wand of claim 8, further comprising a swirl chamber having a plurality of partially enclosed openings that extend along a longitudinal axis of the spray wand, each of partially enclosed opening the plurality of partially enclosed openings configured to convert a flow path of the single liquid stream that is parallel to the longitudinal axis of the spray wand to a cyclonic liquid stream that is angled relative to the longitudinal axis of the spray wand.

28. The spray wand of claim 27, wherein each partially enclosed opening of the plurality of partially enclosed openings have different flow paths within the refill cartridge relative to one another.

29. The refill cartridge assembly of claim 14, further comprising a swirl chamber comprises a plurality of partially enclosed openings configured to convert a flow path of the single liquid stream that is parallel to the longitudinal axis of the spray wand to a cyclonic liquid stream that is angled relative to the longitudinal axis of the spray wand.

30. The refill cartridge assembly of claim 29, wherein each partially enclosed opening of the plurality of partially enclosed openings have different flow paths within the refill cartridge relative to one another.

31. A formulation delivery system configured for outdoor use, the formulation delivery system comprising:

a cleaning composition comprising dichlor mixed with sodium sulfate and magnesium stearate in an amount of 35% to 100% dichlor by weight, wherein the composition is in a form of a solid chemistry, and a spray wand having the cleaning composition positioned within a refill cartridge housed within the spray wand, wherein a longitudinal axis of the refill cartridge and a longitudinal axis of the spray wand are co-axially aligned with one another.

* * * * *